US010498258B2

(12) United States Patent
Lavieville et al.

(10) Patent No.: US 10,498,258 B2
(45) Date of Patent: Dec. 3, 2019

(54) MULTI-LEVEL MEDIUM-VOLTAGE POWER CONVERTER DEVICE HAVING AN AC OUTPUT

(71) Applicant: Schneider Toshiba Inverter Europe SAS, Pacy sur Eure (FR)

(72) Inventors: Jean-Paul Lavieville, Saint Lambert des Bois (FR); Cong Martin Wu, Tarbes (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 15/564,226

(22) PCT Filed: Apr. 15, 2016

(86) PCT No.: PCT/EP2016/058391
§ 371 (c)(1),
(2) Date: Oct. 4, 2017

(87) PCT Pub. No.: WO2016/180599
PCT Pub. Date: Nov. 17, 2016

(65) Prior Publication Data
US 2018/0131291 A1    May 10, 2018

(30) Foreign Application Priority Data
May 11, 2015 (FR) ..................... 15 54177

(51) Int. Cl.
*H02P 27/00* (2006.01)
*H02M 7/5387* (2007.01)
(Continued)

(52) U.S. Cl.
CPC ......... *H02M 7/53871* (2013.01); *H02M 1/08* (2013.01); *H02M 7/483* (2013.01); *H02P 27/08* (2013.01)

(58) Field of Classification Search
CPC .... H02M 7/483; H02M 7/53871; H02M 1/08; H02P 27/08
(Continued)

(56) References Cited

U.S. PATENT DOCUMENTS 9,948,206 B2 *   4/2018  Hasegawa ............. H02M 7/483
2012/0026767 A1 *  2/2012  Inoue .................... H02M 7/217
                                                      363/89

(Continued)

FOREIGN PATENT DOCUMENTS

EP    2 408 081 A1    1/2012
EP    2 963 801 A1    1/2016
WO    2014/133026 A1  9/2014

OTHER PUBLICATIONS

International Search Report dated Jun. 23, 2016, in PCT/EP2016/058391, filed Apr. 15, 2016.
(Continued)

*Primary Examiner* — Bickey Dhakal
*Assistant Examiner* — Gabriel Agared
(74) *Attorney, Agent, or Firm* — Oblon, McClelland, Maier & Neustadt, L.L.P.

(57) ABSTRACT

A modular multi-level power converter device including an AC output, including a modular multi-level DC/AC converter including a plurality of arms in parallel, ends of which define input terminals, each arm including two lines of modules in series, each switching module including a pair of switches in series, mounted on terminals of an energy-storage device, the DC/AC converter adjusting frequency at an output of the converter device. The device further includes a converter including a DC output, including two output terminals connected to the input terminals of the DC/AC converter, the converter including a DC output adjusting amplitude at an output of the converter device, the DC/AC converter further including a mechanism controlling
(Continued)

the switches of the modules, which apply a full-wave command to the switches during at least one time interval, the modules of a single line being in a same state simultaneously.

14 Claims, 15 Drawing Sheets

(51) Int. Cl.
*H02M 7/483* (2007.01)
*H02M 1/08* (2006.01)
*H02P 27/08* (2006.01)

(58) Field of Classification Search
USPC .......................................................... 318/811
See application file for complete search history.

(56) References Cited

U.S. PATENT DOCUMENTS

2017/0214310 A1* 7/2017 Zhang ................... H02M 7/487
2017/0214334 A1* 7/2017 Mukunoki .............. H02M 1/12

OTHER PUBLICATIONS

Hagiwara, Makoto, et al., "Startup and Low-Speed Operation of an Adjustable-Speed Motor Driven by a Modular Multilevel Cascade Inverter (MMCI)", Energy Conversion Congress and Exposition (ECCE), XP 032467556A, Sep. 15, 2012, pp. 718-725.

* cited by examiner

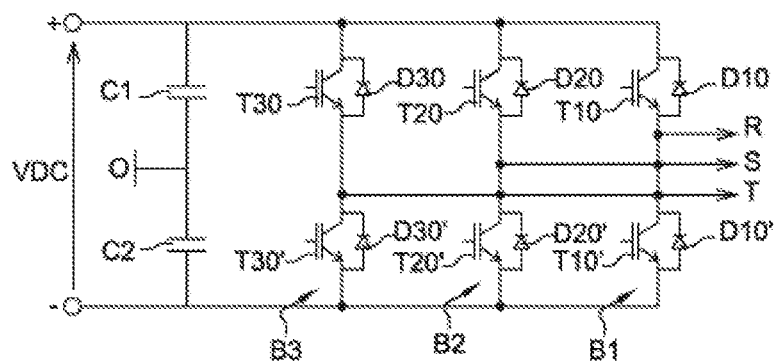
Fig. 10A
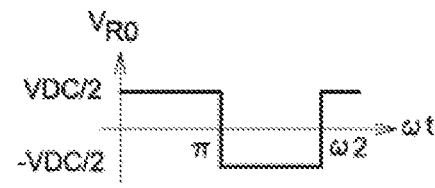
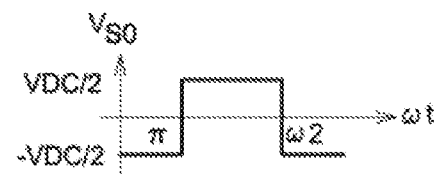
Fig. 10B
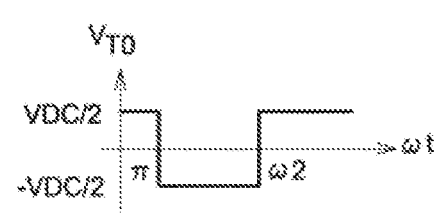
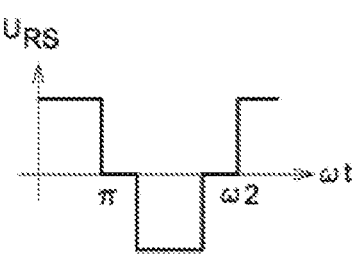

MULTI-LEVEL MEDIUM-VOLTAGE POWER CONVERTER DEVICE HAVING AN AC OUTPUT

TECHNICAL FIELD

The present invention relates to the field of multilevel power conversion devices with AC output intended to operate at medium voltage. Such converters can be used in high-power variable speed drive applications for AC motors. One of the major markets for medium-voltage variable speed drives is the replacement of rotating electric machines operating at fixed speed, i.e. 97% of market share, with a variable-speed system, by integrating a variable speed drive which will pilot the same rotating machine.

PRIOR ART

Multilevel DC/AC power converters are based on placing switching modules in series, the latter being formed with electronic switches to allow a high voltage rise at output, these electronic switches being low-voltage components which have limited voltage withstand.

Power converters of NPC (for Neutral Point Clamped) type are known, comprising a series of several modules with two pairs of electronic switches in series, two diodes in series connected on one side to the common node between the two electronic switches of the first pair and on the other to the common node between the two electronic switches of the second pair. Moreover, there is a series of two capacitors connected to the terminals of the assembly formed by the pairs of electronic switches. The common node between the two diodes in series is linked to the common node between the two capacitors of the series.

This type of module leads to a satisfactory waveform and to a reduction in the voltage constraints on the electronic switches. On the other hand, imbalances of the voltage across the terminals of the capacitors can arise.

Improvements to the NPC original topology have occurred, by replacing the two diodes by a pair of electronic switches. This topology is dubbed ANPC with 3 voltage levels.

To further increase the acceptable voltage level, it has been proposed to place more electronic switches in series and to add capacitors, thereby leading to the topology dubbed ANPC with 5 voltage levels. Cells of ANPC 5 voltage levels type are currently limited to voltage levels of the order of 6.9 kV, which is not necessarily sufficient.

As illustrated in FIG. 1, also known is a DC/AC Modular Multilevel Converter (known as an MMC) comprising several arms 1.1, 1.2, 1.3 whose ends define DC extreme terminals 1p, 1n to be mounted in parallel across the terminals of a DC power supply, each arm 1.1, 1.2, 1.3 is formed of two half-arms 1.11, 1.12, 1.21, 1.22, 1.31, 1.32 mounted in series and linked to a common terminal 3.1, 3.2, 3.3. These common terminals 3.1, 3.2, 3.3 define AC terminals to be linked to an AC load 70. This load 70 is represented as a motor. In the example, the DC/AC converter is three-phase, each of the arms 1.1, 1.2, 1.3 corresponding to a phase, phase 1 for arm 1.1, phase 2 for arm 1.2 and phase 3 for arm 1.3. A single-phase converter would have only two arms.

Each half-arm 1.11, 1.12, 1.21, 1.22, 1.31, 1.32 comprises a chain of switching modules mounted in series. It is linked to one of the common terminals 3.1, 3.2, 3.3 via an inductor L11, L12, L21, L22, L31, L32 so as to comply with the connection rules for current source and voltage source. It is preferable that the two inductors of one and the same arm have one and the same value so as to simplify the operation of the setup. The two inductors could be coupled. In the subsequent description, the chain of modules linked to the positive DC terminal 1p will be called the first chain of modules, and that linked to the negative DC terminal 1n, the second chain of modules. There is the same number of switching modules in each half-arm.

The switching modules of the arm 1.1 are successively referenced 4.11 to 4.16 from the terminal 1p to the terminal 1n. The switching modules of the arm 1.2 are successively referenced 4.21 to 4.26 from the terminal 1p to the terminal 1n. The switching modules of the arm 1.3 are successively referenced 4.31 to 4.36 from the terminal 1p to the terminal 1n.

Each switching module comprises at least one pair of electronic switches arranged in series having a common node 40, the pair being connected in parallel with an energy storage device 4.3 forming a half-bridge arrangement, the energy storage device 4.3 having a floating capacitance.

The electronic switches of the module 4.11 are referenced T111, T211. The electronic switches of the module 4.12 are referenced T112, T212. The numberings continue in the same manner and thus the electronic switches of the module 4.16 are referenced T116, T216.

In the arm 1.2, the electronic switches of the module 4.21 are referenced T121, T221. The electronic switches of the module 4.22 are referenced T122, T222. The electronic switches of the module 4.26 are referenced T126, T226.

In the arm 1.3, electronic switches of the module 4.31 are referenced T131, T231. The electronic switches of the module 4.32 are referenced T132, T232. The electronic switches of the module 4.36 are referenced T136, T236.

In each module, the energy storage device 4.3 has a terminal of positive polarity (+) through which there re-enters a charging current (positive current) intended to charge it. The energy storage device 4.3 has a terminal of negative polarity (−) through which there re-enters a discharging current (negative current) intended to discharge it. One of the electronic switches is linked to the positive terminal (+) of the energy storage device 4.3, namely that at the top dubbed T111 for the switching module 4.11. The other electronic switch is linked to the negative terminal (−) of the energy storage device 4.3, namely that at the bottom dubbed T211 for the switching module 4.11.

The diode mounted in antiparallel with the electronic power switch T111 is referenced D111. The diode mounted in antiparallel with the electronic power switch T211 is referenced D211.

The numberings of the electronic power switches and of the diodes of the other modules follow the same principle. They are not necessarily named in this description but are referenced in certain figures. In the subsequent description, the electronic switches T111, T112, 1113, T114, T115, T116, linked to the positive terminal (+) of an energy storage device 4.3 are called first electronic switches and the electronic switches T211, 1212, T213, T214, T215, T216 linked to the negative terminal (−) of an energy storage device 4.3 are called second electronic switches. This terminology also applies to the diodes.

In one and the same switching chain, all the electronic power switches linked to a terminal of like polarity of the energy storage devices are termed homologues.

The modules of a half-arm are assigned a rank counted in an ascending manner from the most positive end of the half-arm. The modules of two half-arms of one and the same arm which have the same rank are termed homologues.

The electronic power switches T111, T211, etc . . . can be chosen, for example, from among IGBT insulated-gate bipolar transistors, FET field-effect transistors, MOSFET MOS transistors, GTO gate turn-off thyristors, IGCT integrated gate-commutated thyristors, etc.

The energy storage device 4.3 can be chosen, for example, from among a capacitor, a battery, a fuel cell etc.

In FIGS. 2A to 2D has been represented a switching module of the same type as those illustrated in FIG. 1.

Its first electronic power switch is called T1 and the associated diode D1. Its second electronic power switch is called T2 and the associated diode D2. In these figures, the flow paths of a current Iu internal to such a switching module, as a function of the off or on state of its electronic power switches T1, T2, are visible. The current Iu is alternately positive (FIGS. 2A, 2B) and negative (FIGS. 2C, 2D). The two electronic power switches T1, T2 of one and the same module are in opposite states (on or off) to within a dead time value. It is not necessary for the two electronic power switches T1, T2 of a switching module to be on at the same time, if not, the energy storage device 4.3 is short-circuited.

In FIG. 2A, the first electronic power switch T1 is on and the second electronic power switch T2 is off. The current Iu is positive, it enters the switching module 4 through the first electronic power switch T1 and emerges therefrom through the common node 40 between the two electronic power switches T1, T2. It does not pass through the energy storage device 4.3.

In FIG. 2B, the second electronic power switch T2 is on and the first electronic power switch T1 is off. The current Iu is positive, it enters the switching module 4 through the energy storage device 4.3, it passes through the second diode D2 and emerges through the common node 40 between the two electronic power switches T1, T2. The current Iu charges the energy storage device 4.3.

In FIG. 2C, the first electronic power switch T1 is on and the second electronic power switch T2 is off. The current Iu is negative, it enters the switching module 4 through the common node 40 between the two electronic power switches T1, T2, it passes through the first diode D1 and emerges from the switching module through the cathode of the first diode D1. It does not pass through the energy storage device 4.3.

In FIG. 2D, the second electronic power switch T2 is on and the first electronic power switch T1 is off. The current Iu is negative, it enters the switching module through the common node 40 between the two electronic power switches T1, T2, it passes through the second electronic power switch T2, the energy storage device 4.3 and emerges from the switching module without passing either through the first electronic power switch T1, or through the first diode D1. The energy storage device 4.3 discharges.

In conventional modular multilevel DC/AC converters such as that of FIG. 1, the function of the chains of switching modules is both to adapt the amplitude of the signal formed on the basis of the DC electrical power supply and present at the level of each common terminal 3.1, 3.2, 3.3 and to regulate the frequency of this signal. The electronic power switches are controlled by Pulse Width Modulation PWM.

With such a control of the electronic power switches T1, T2, one passes alternately, when the current Iu is positive, from the situation where the first electronic power switch T1 is on (FIG. 2A), to the situation where the second diode D2 conducts (FIG. 2B). Whenever the second diode D2 conducts, the voltage across the terminals of the energy storage device 4.3 increases. When the current Iu is negative, one passes alternately from the situation where the second electronic power switch T2 is on (FIG. 2D) to the situation where the first diode D1 conducts (FIG. 2C). Whenever the second electronic power switch T2 is on, the voltage across the terminals of the energy storage device 4.3 decreases.

Referring again to FIG. 1, and focusing attention on one of the arms, for example the arm 1.1, there is a relationship between the control of the modules of its two half-arms.

It is assumed that the setup is well balanced and that the voltage delivered by the DC electrical power supply equals VDC, each energy storage device 4.3 is charged to VDC/3 since in the example represented, the chain of switching modules comprises three switching modules in each half-arm. With n modules the voltage would be VDC/n. It is not possible, in one and the same arm, for all the electronic power switches linked to one and the same terminal, either positive or negative, of the energy storage devices to be on at the same time, in order to comply with the equation for the voltages. Indeed at each instant, the sum of the voltage across the terminals of one half-arm and of the voltage across the terminals of the other half-arm is equal to the voltage delivered by the DC electrical power supply.

In a half-arm, with this PWM control, the switching modules are activated successively, this meaning that the electronic power switches linked to one and the same terminal, either positive or negative, of the energy storage devices are turned on or off successively. The AC voltage created, tapped off at the level of one of the common terminals 3.1, 3.2 or 3.3, comprises a number of levels which is equal to the number of modules in half-arm plus one.

A modular multilevel converter using in each arm two chains of switching modules mounted in series such as those of FIG. 2 was described for the first time in patent application DE 10 10 031 of Rainer Marquardt.

Patent application EP 2 408 081 also describes a multi-level converter using chains of switching modules mounted in series.

Documents WO2014/133026A1 and EP2963801A1 also describe modular multilevel power conversion devices. Likewise in the article entitled "*Start-up and low speed operation of an adjustable-speed motor driven by a modular multilevel cascade inverter*"—Makoto et al.—ECCE, 2012—IEE—15 Sep. 2012, pages 718-725.

If these modular multilevel DC/AC converters are intended to provide output signals, AC side, at very low frequency, for example less than about ten Hertz, making it possible in particular to adjust the speed of AC motors, as there are floating-capacitance energy storage devices within each switching module, the current flowing in these energy storage devices reverses direction so slowly that they continue to charge until reaching their breakdown voltage and are at risk of being impaired. If one is then obliged to over-dimension these energy storage devices, the cost of the modular multilevel converter becomes prohibitive, since these energy storage devices are generally very expensive.

Moreover, the size and the cost of the energy storage devices included in these modular multilevel converters are inversely proportional to the frequency of the output signal. The lower the frequency, the bulkier and more expensive the converters. This limits the employment of modular multi-level converters with many switching modules for the power supply of variable-speed AC motors.

DISCLOSURE OF THE INVENTION

The aim of the present invention is specifically to propose a modular multilevel power conversion device with AC output which can provide low-frequency signals without however being bulky and expensive.

Another aim of the invention is to provide a modular multilevel power conversion device which uses low-voltage power components for medium-voltage applications, these components making it possible to obtain better efficiency than with medium-voltage components.

Another aim of the invention is to provide a modular multilevel power conversion device which does not need to have overdimensioned floating-capacitance energy storage devices.

Yet another aim of the invention is to provide a variable speed drive which uses a modular multilevel power conversion device thus characterized and which can operate at constant torque and low speed in particular for ventilation, pumping, traction applications.

An additional aim of the invention is to propose a variable speed drive having needs in terms of passive components which are reduced, such as a bulky and expensive power transformer or smoothing LC filters.

To achieve same the present invention is a modular multilevel power conversion device with AC output and AC or DC input comprising:

a modular multilevel DC/AC converter, having several arms mounted in parallel, whose ends define DC input terminals, each arm comprising two chains of switching modules in series, linked to a common terminal, this common terminal defining an AC output terminal of the modular multilevel power conversion device, each switching module comprising at least one pair of electronic power switches arranged in series, mounted on the terminals of an energy storage device, the electronic power switches of one and the same chain, which are linked to a terminal of like polarity of the energy storage device being termed homologues, the modular multilevel DC/AC converter being designed to adjust the output frequency of the modular multilevel conversion device and comprising, furthermore, control means for the electronic power switches so as to place them in an on or off state, characterized in that:

the control means are adapted to apply full-wave control to the electronic power switches, during at least one part of a time interval of operation of the power conversion device, the switching modules of one and the same chain then having their homologous electronic power switches in one and the same state simultaneously and in that it furthermore comprises:

a converter with DC output and DC or AC input comprising two output terminals linked to the DC input terminals of the modular multilevel converter, said converter with DC output being designed to adjust the output amplitude of the power conversion device.

Each module comprises a first power switch linked to a terminal of positive polarity of the energy storage device and a second power switch linked to a terminal of negative polarity of the energy storage device and during the full-wave control, a current flows only in the switching modules whose first power switch is in the on state.

The control means apply, during at least one second remaining part of the time interval, a PWM control to the electronic power switches, the PWM control being applied when an output current of the modular multilevel power conversion device is less than a threshold, the full-wave control being applied when the output current is greater than or equal to the threshold.

During the PWM control, the control means control the electronic power switches of modules of one and the same chain of modules, successively.

In a module, each electronic power switch is associated with a diode in antiparallel so as to form a current-wise bidirectional switching element.

The connection of the chains of modules of one and the same arm to the common terminal is effected via inductors.

Each electronic power switch can be chosen from among an insulated-gate bipolar transistor, a field-effect transistor, a MOSFET transistor, a gate turn-off thyristor, an integrated gate-commutated thyristor.

The energy storage device can be chosen from among a capacitor, a battery, a fuel cell.

It is possible for the converter with DC output and DC input to be a modular multilevel DC/DC converter possessing a single arm whose ends define two DC input terminals, comprising two half-arms in series having a common terminal, this common terminal defining one of the DC output terminals, one of the ends of the arm defining the other output terminal, each half-arm comprising a chain of switching modules with at least one pair of electronic power switches mounted in series, this pair being mounted across the terminals of an energy storage device, and control means for the electronic power switches of each module.

The control means for the electronic power switches of each module of the modular multilevel DC/DC converter can apply full-wave control to the electronic power switches, the full-wave control having a larger frequency than the frequency of the full-wave control of the control means for the electronic power switches of each module of the modular multilevel DC/AC converter.

The converter with DC output and AC input can be a controlled-switching rectifier bridge.

As a variant, the converter with DC output and AC input can be a modular multilevel AC/DC converter.

The present invention also relates to a variable speed drive comprising a modular multilevel power conversion device thus characterized.

When the modular multilevel power conversion device comprises a converter with DC output and AC input, the AC input is designed to be linked to an AC electrical power supply.

When the modular multilevel power conversion device comprises a converter with DC input and DC output, the variable speed drive can comprise, furthermore, a converter with AC input and DC output, designed to be linked on AC input side to an AC electrical power supply and linked on DC output side to the converter with DC input and DC output.

A transformer designed to be linked on one side to the AC electrical power supply and linked on the other side to the AC input of the converter with AC input and DC output of the modular multilevel power conversion device can be provided in the variable speed drive.

BRIEF DESCRIPTION OF THE DRAWINGS

The present invention will be better understood on reading the description of exemplary embodiments, which are given purely by way of wholly non-limiting indication, while referring to the appended drawings in which:

FIGS. 5A1, 5A2, illustrate as a function of time, the reference signal and the sawtooth carrier that are used to determine the moments of full-wave control and of PWM control applied to the electronic power switches, in FIG. 5A1 the reference signal is a complete sinusoid and in FIG. 5A2 the reference signal is a sinusoid truncated at the level of the peaks.

FIG. 10A illustrates a three-phase DC/AC converter with two switching modules per arm and FIG. 10B illustrates timecharts of the simple voltage obtained between its AC output terminals R, S, T and the midpoint O and of the compound voltage between the terminals R and S during full-wave control.

Identical, similar or equivalent parts of the various figures described hereinafter bear the same numerical references so as to facilitate passage from one figure to the other.

DETAILED DISCLOSURE OF PARTICULAR EMBODIMENTS

Figure 3:
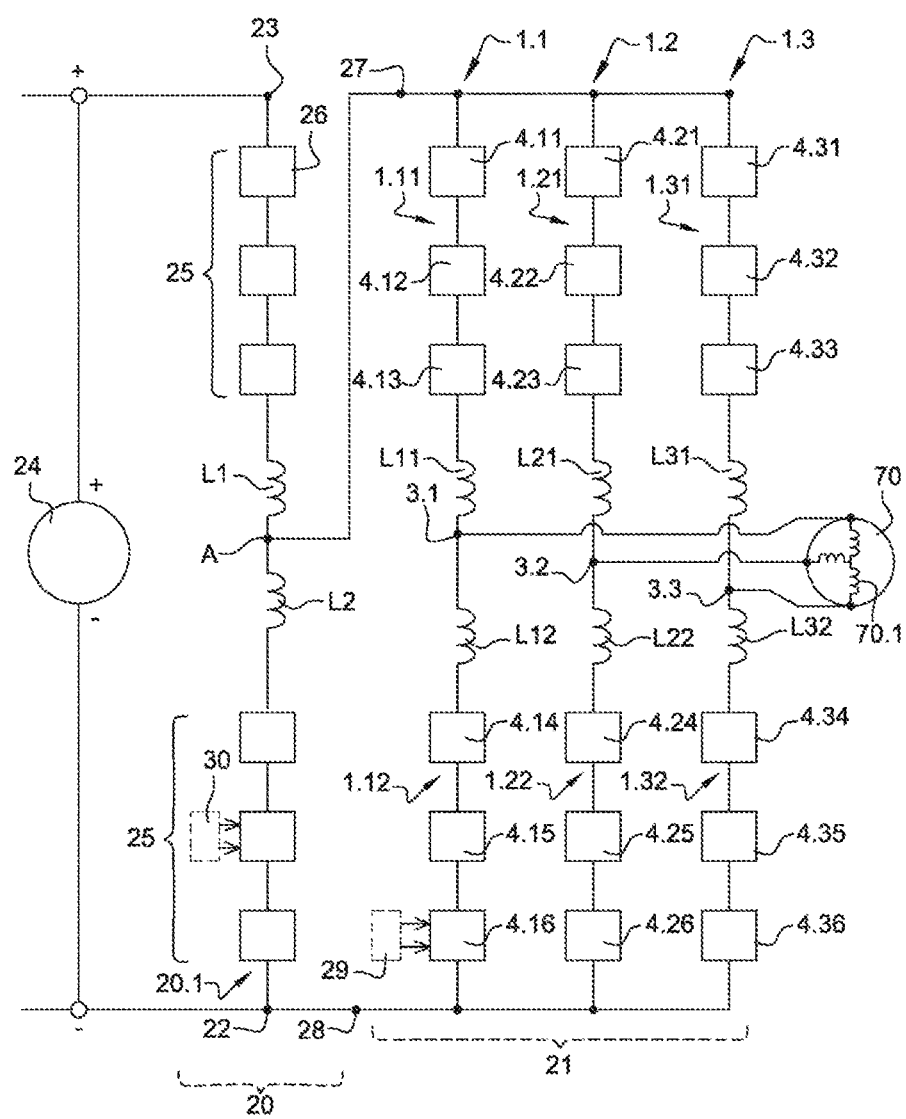
FIG. 3 illustrates an exemplary modular multilevel power conversion device with DC input and AC output which is the subject of the invention.

Attention will now be focused, while referring to FIG. 3, on an exemplary modular multilevel power conversion device with AC output and DC input which is the subject of the invention. This is a three-phase power conversion device.

It comprises in cascade a modular multilevel DC/DC converter (or chopper) 20 and a modular multilevel DC/AC converter (or inverter) 21.

The multilevel DC/DC converter 20 comprises an arm 20.1 whose ends 22, 23 form two DC input terminals which are intended, in use, to be linked to a DC electrical power supply 24. The arm 20.1 comprises two half-arms 25 in series having a common terminal A. Each half-arm 25 comprises a chain of switching modules 26 linked to the common terminal A via an inductor L1, L2. These switching modules are similar to those of FIGS. 2A-2D, with a pair of current-wise bidirectional switching elements in series and a floating energy storage device mounted in parallel with said pair. We have not represented each switching module 26 in detail, it suffices to refer to FIGS. 2A-2D to see their structure.

Figure 1:
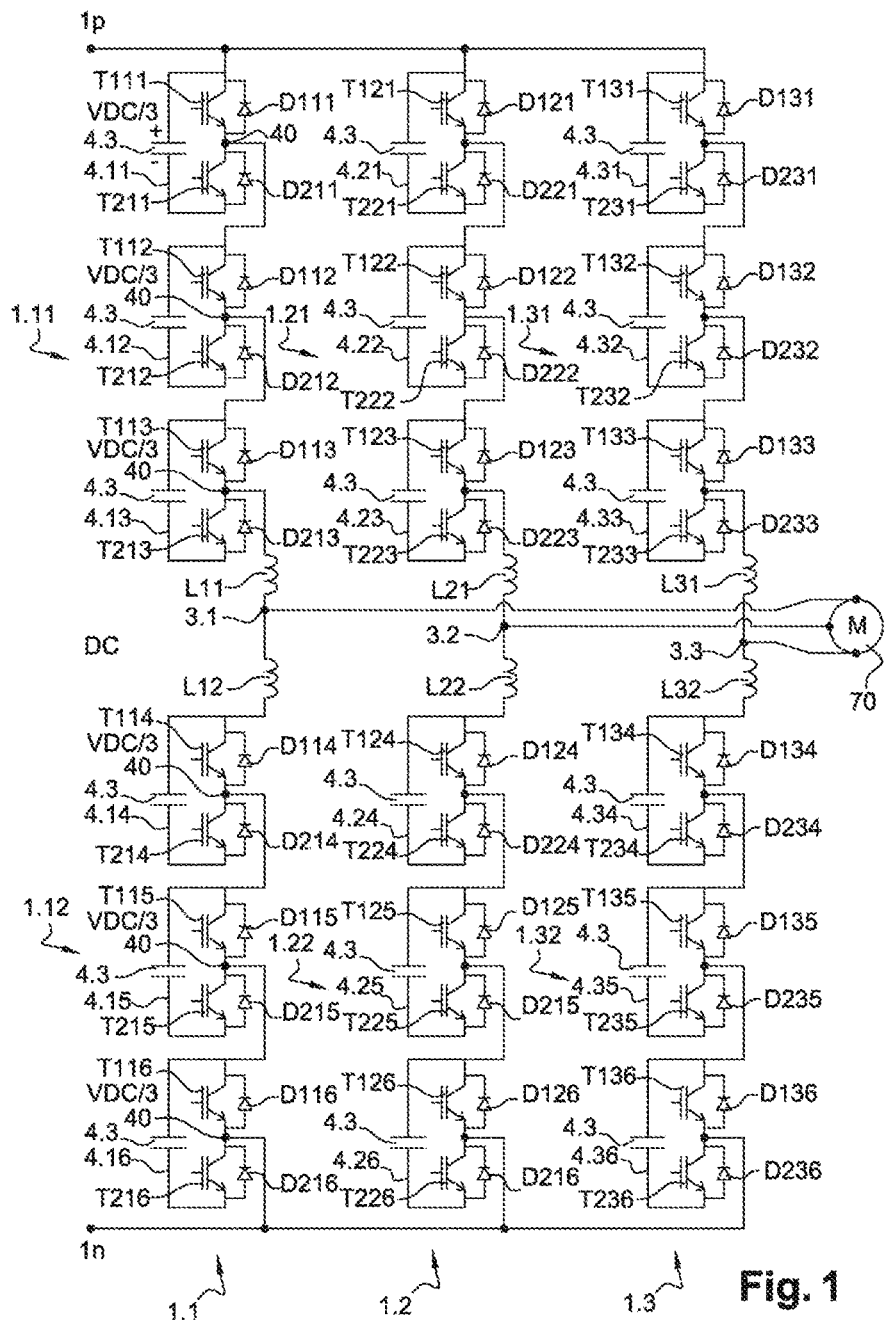
FIG. 1, already described, illustrates a conventional DC/AC modular multilevel converter.

The modular multilevel DC/AC converter 21 is similar to that described in FIG. 1. It is not described again in detail. All the arms 1.1, 1.2, 1.3 of the converter are linked in parallel and their ends define two DC terminals referenced 27, 28. The terminal 27 (positive) is linked to the common terminal A of the modular multilevel DC/DC converter 20 and the terminal 28 (negative) is linked to one of the ends 22 of the arm 20.1, the end intended for the negative terminal of the DC electrical power supply 24. These are the input terminals of the modular multilevel DC/AC converter 21 or the output terminals of the modular multilevel DC/DC converter 20. It is assumed that all the components of the modular multilevel DC/AC converter 21 bear the same references as in FIG. 1. Each half-arm and therefore each chain of modules are therefore linked to one of the DC input terminals 27 or 28.

In the present invention, the function of the modular multilevel DC/AC converter 21 is to convert the DC voltage provided by the modular multilevel DC/DC converter 20 into AC voltage and to regulate the frequency of the signals at the output, that is to say of the signals present on the common terminals 3.1, 3.2, 3.3, AC side. These common terminals 3.1, 3.2, 3.3 are to be linked to the load, represented in this example as a motor 70 with three star-mounted windings and therefore having a common terminal 70.1. Each winding is mounted between one of the common terminals 3.1, 3.2, 3.3 linking the two half-arms of an arm and the common terminal 70.1 of the load 70. Contrary to what happened in the prior art, the amplitude of these signals is what is controlled by the modular multilevel DC/DC converter 20. There is decoupling between the frequency control function and the amplitude control function.

A characteristic of the modular multilevel power conversion device with AC output which is the subject of the invention is that, for each module of the modular multilevel DC/AC converter 21, the control of its electronic power switches is such that the passage of a current is limited to the maximum, whichever its direction of flow, in the energy storage devices 4.3. This current is a charging current or positive current or a discharging current or negative current. The duration of the states represented in the previously described FIGS. 2B and 2D is thus limited so as to prevent the energy storage devices from charging or discharging for too long a time.

Figure 2A:
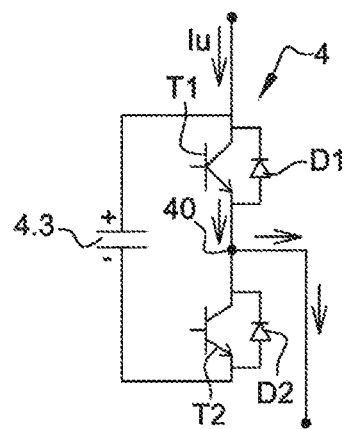
FIGS. 2A, 2B, 2C, 2D, already described, illustrate the various paths of the current in a switching module as a function of the state of its electronic power switches.
Figure 2C:
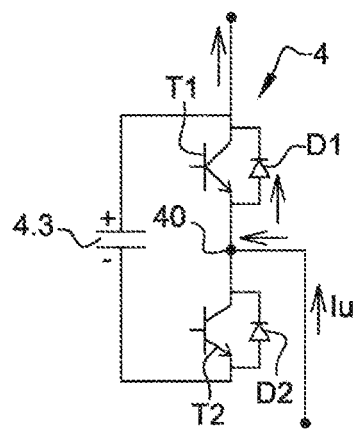
Figure 2B:
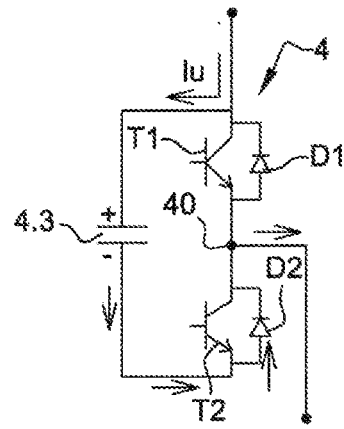
Figure 2D:
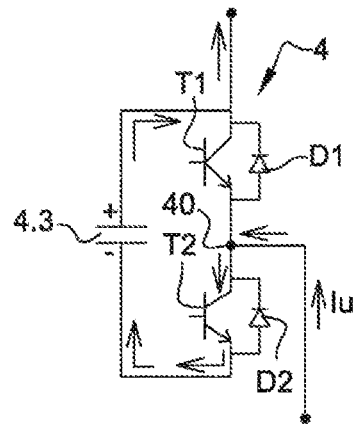

One seeks not to be or to be as little as possible in the configurations of FIGS. 2B, 2D and to be in the configurations of FIGS. 2A, 2C most often and for the longest time.

Such a flow of the current internal to the modular multilevel DC/AC converter 21 is possible if the electronic power switches of each switching module are controlled with full-wave control.

Represented schematically in FIG. 3, with the reference 29, and for a single of the switching modules 4.16 only, are control means for its electronic power switches T116 and T216. Of course, such control means exist for all the electronic power switches of all the modules of the modular multilevel DC/AC converter 21.

To facilitate understanding of the operation of the modular multilevel DC/AC converter 21, the operation of a three-phase conventional DC/AC converter controlled by full-wave control will firstly be explained while referring to FIG. 10A. This is not a multilevel converter. It comprises three arms B1, B2, B3 linked by their extreme terminals in parallel across the terminals of a DC electrical power supply delivering a voltage VDC and represented by two capacitors C1, C2 in series having a midpoint O. Each arm splits into two half-arms which have a common terminal and these common terminals form the AC output terminals of the converter are referenced R, S, T. Each half-arm comprises only a current-wise bidirectional switching element with an electronic power switch and a diode in antiparallel. The arm B1 comprises the electronic power switch T10, the diode D10, they are linked to the positive terminal (+) of the DC electrical power supply source, i.e. to the capacitor C1. The arm B1 also comprises the electronic power switch T10', the diode D10', they are linked to the negative terminal (−) of the DC electrical power supply source, i.e. to the capacitor C2. The arm B2 comprises the electronic power switch T20, the diode D2, they are linked to the positive terminal (+) of the DC electrical power supply source, i.e. to the capacitor C1. The arm B2 also comprises the electronic power switch T20', the diode D20', they are linked to the negative terminal (−) of the DC electrical power supply source, i.e. to the capacitor C2. The arm B3 comprises the electronic power switch T30, the diode D30, they are linked to the positive terminal (+) of the DC electrical power supply source, i.e. to the capacitor C1. The arm B3 also comprises the electronic power switch T30', the diode D30', they are linked to the negative terminal (−) of the DC electrical power supply source, i.e. to the capacitor C2.

The voltage between an AC output terminal R, S or T and the midpoint O varies between +VDC/2 and −VDC/2 in the manner represented in FIG. 10B with full-wave control. The electronic power switches of each module are in opposite states to within a dead time, since they must not be on at the same time at the risk of short-circuiting the electrical power supply source VDC. Over a period of the output signal, each electronic power switch is on for half the time. The first three timecharts represent respectively the simple voltages $V_{R0}$, $V_{S0}$, $V_{T0}$ and the last timechart represents the compound voltage $U_{RS}$ between the terminal R and the terminal S.

When the electronic power switch T10 is on, the voltage of the output terminal R goes to +VDC/2. If the current traveling along the arm B1 is positive, it passes through the electronic power switch T10. If the current traveling along the arm B1 is negative, it passes through the diode D10. When the electronic power switch T10' is on, the voltage of the output terminal R goes to −VDC/2. If the current traveling along the arm B1 is positive, it passes through the diode D10'. If the current traveling along the arm B1 is negative, it passes through the electronic power switch T10'.

For each of the arms 1.1, 1.2, 1.3, during one half of the period, the inductor L11, L21, L31 is linked to the positive input terminal 27 and during the other half, the inductor L12, L22, L32 is linked to the negative input terminal 28. Because of the presence of these inductors, the potential present at the positive input terminal 27 or at the negative input terminal is never present on the common terminals 3.1, 3.2, 3.3. The potential on these common terminals is not controlled directly.

In the DC/AC converter 21 illustrated in FIG. 3, to obtain the voltage +VDC on a common node 40 linked to one of the inductors L11, L21, L31, the control means 29 turn on simultaneously the first electronic power switches T111, T112, T113 of all the switching modules 4.11, 4.12, 4.13 of the first chain of modules. However, the first electronic power switches T114, T115, T116 of all the switching modules 4.14, 4.15, 4.16 of the second chain of modules must not be on. They are off since otherwise an arm short-circuit is created.

To be certain of not obtaining this short-circuit, the control means 29 also turn on all the second electronic power switches T214, T215, T216 of all the switching modules 4.14, 4.15, 4.16 of the second chain of modules, doing so in synchronism with the control of the first electronic power switches T111, T112, 1113 of the first chain of modules.

To obtain the voltage −VDC on an extreme terminal of the inductors L12, L22, L32 which is opposite to the terminal linked to a common terminal 3.1, 3.2, 3.3, the control means 29 turn on simultaneously the first electronic power switches T114, 1115, T116 of all the switching modules 4.14, 4.15, 4.16 of the second chain of modules. However, the first electronic power switches T111, 1112, T113 of all the switching modules 4.11, 4.12, 4.13 of the first chain of modules must not be on. They are off since otherwise an arm short-circuit is created.

To be certain of not obtaining this short-circuit, the control means 29 also turn on all the second electronic power switches T211, T212, T213 of all the switching modules 4.11, 4.12, 4.13 of the first chain of modules, doing so in synchronism with the control of the first electronic power switches T114, T115, 1116 of the second chain of modules.

In the modules having their first electronic power switch on, the current will pass through it if it is positive (as in FIG. 2A) and will pass through the first diode if it is negative (as in FIG. 2C). It no longer passes through the energy storage device. The current flows only in the switching modules whose first power switch is on. It will not pass through the switching modules whose second power switch is on.

The first electronic power switches of one chain of switching modules and the first electronic power switches of the other chain of switching modules are in complementary states to within a dead time.

The second electronic power switches of one chain of switching modules and the second electronic power switches of the other chain of switching modules are in complementary states to within a dead time.

The electronic power switches of one and the same switching module are in complementary states to within a dead time.

When a second electronic power switch is turned on in a switching module, the voltage of the energy storage device is found across the terminals of the first electronic power switch of this switching module.

In the present invention, with the full-wave control, the second electronic power switches are not involved in the generation of the output signals. But by turning them on and by associating them with the energy storage device, they have a function of clipping the voltage applied to the terminals of the first electronic power switches which are then in the off state. They therefore do indeed have their place in the setup.

Thus the energy storage devices 4.3 are then used only as signal clippers. The capacitance values of the energy storage devices 4.3 can be reduced with respect to those necessary with conventional PWM control.

In the present invention, within the framework of an application to a load of three-phase asynchronous motor type, the frequency may be of the order of a Hertz or indeed up to about ten Hertz and the duty ratio of 0.5. The duty ratio corresponds to half the period of the signal desired at the output of the modular multilevel power conversion device with AC output.

Figure 4A:
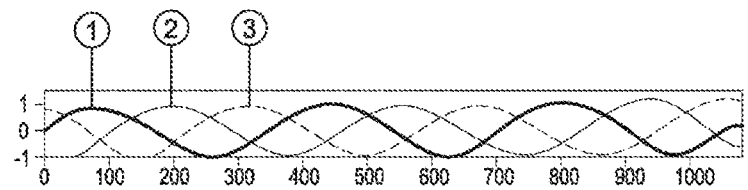
FIG. 4A illustrates sinusoidal command signals which will serve to determine the instants of switching of the first and second power switches of a switching module of the first arm, second and third arm of the modular multilevel DC/AC converter of FIG. 3, in the case of full-wave control.

Represented in FIG. 4A are sinusoidal command signals which will serve to determine the instants of switching of the first and second electronic power switches of a switching module of the modular multilevel DC/AC converter 21. These modules are all in a first chain of modules. Sinusoid ① relates, for example, to the electronic power switches T111, T211 of the switching module 4.11 of the arm 1.1. Sinusoid ② relates, for example, to the electronic power switches T121, T221 of the switching module 4.21 of the arm 1.2. Sinusoid ③ relates to the electronic power switches T131, T231 of the switching module 4.31 of the arm 1.3. The switching instants correspond to the instants at which the command signal changes sign.

Figure 4B:
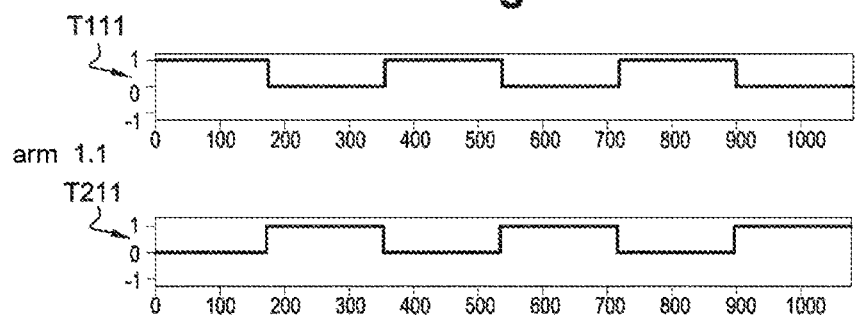
FIGS. 4B, 4C, 4D are timecharts illustrating, on the basis of the command signals of FIG. 4A, the state of the electronic power switches of a switching module located in each of the arms of the modular multilevel DC/AC converter of FIG. 3.
Figure 4C:
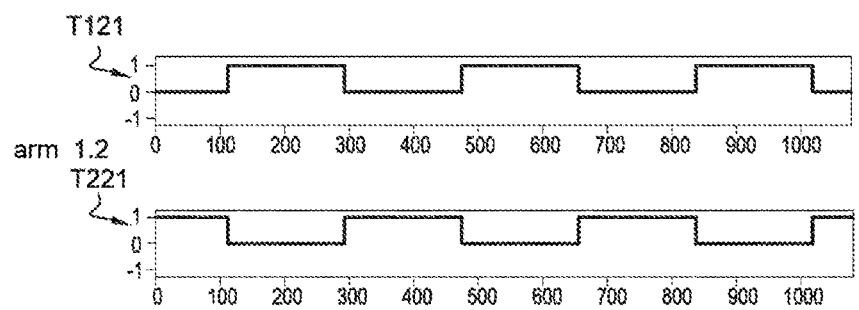
Figure 4D:
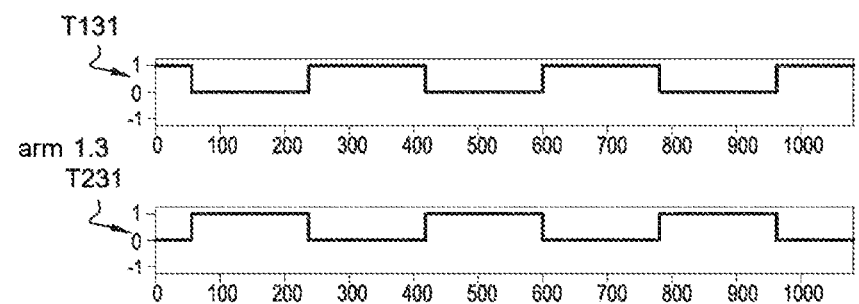

Represented in the timechart of FIGS. 4B, 4C, 4D is the state of the first and second electronic power switches T111 and T211, T121 and T221, T131 and T231 respectively during full-wave control. The controls on the various arms are shifted by a third of a period. In the state 1 they are on and in the state 0 they are off. The switching of the electronic power switches is caused by the change of sign of the associated command signal.

Figure 4E:
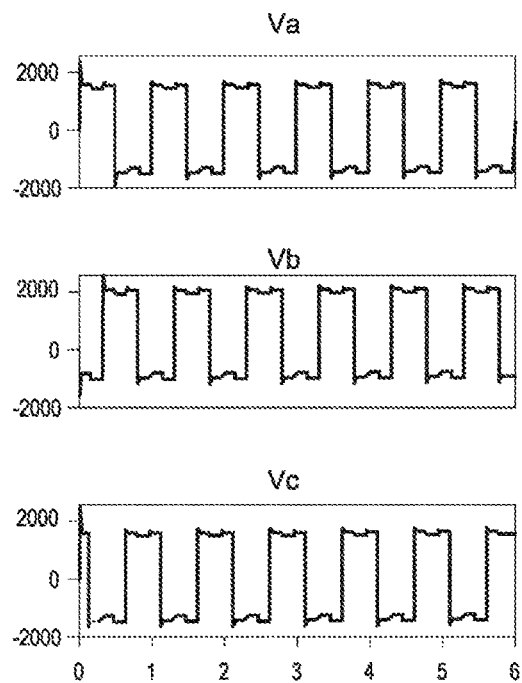
FIG. 4E illustrates the evolution, as a function of time, of the simple voltages Va, Vb, Vc.

Represented in FIG. 4E is the evolution, as a function of time, of the simple voltage called respectively Va, Vb, Vc. The simple voltage Va, Vb, Vc is the voltage taken between each common terminal 3.1, 3.2, 3.3 and a fictitious midpoint of the input DC power supply (DC bus) of the modular multilevel DC/AC converter 21. This simple voltage possesses two porches, one positive and the other negative. There is an offset at the top of these porches, this is due to the fact that the potential on the common terminals 3.1, 3.2, 3.3 is not controlled directly.

Figure 4F:
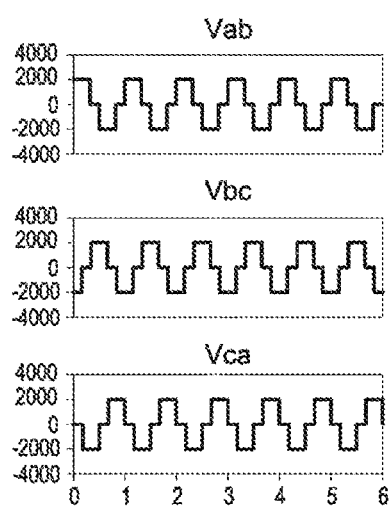
FIG. 4F illustrates the evolution, as a function of time, of the compound voltages tapped off between two common terminals.

Represented in FIG. 4F is the evolution, as a function of time, of the compound voltage tapped off between two common terminals. The voltage Vab is present between the terminals 3.1 and 3.2, the voltage Vbc is present between the terminals 3.2 and 3.3 and the voltage Vca is present between the terminals 3.3 and 3.1. This compound voltage possesses three porches one zero, one positive and one negative.

Ultimately, whatever the number of switching modules placed in series in the half-arm, the compound voltage always has three levels. The control provided by the control means 29 is simple since all the switching modules of one and the same half-arm are controlled in an identical manner in synchronism. Their first electronic power switches are in one and the same state at the same time. Their second electronic power switches are in one and the same state at the same time, this state being opposite to that of the first electronic power switches. The modules of one and the same arm, but belonging to different half-arms, are controlled in an opposite manner in synchronism. On the other hand, the shape of the output signals is fairly far from a sinusoid which is always the waveform sought for the power supply of the AC load.

With this full-wave control, for each arm, according to the sign of the command voltage, the state of the first and second electronic power switches of all the modules of one of its half-arms is intentionally controlled in synchronism in such a way that the current flowing in each of the modules of this half-arm does not pass through the energy storage device 4.3. The need in terms of capacitance and the voltage ripple across the terminals of the energy storage devices are greatly reduced. The energy storage devices 4.3 have a function of clipping overvoltages appearing during the switchings of the first and second electronic power switches of a module which are not synchronous, that is to say during the dead times.

The dimensioning of the energy storage devices is obtained with the conventional formula I=CdU/dt with C capacitance of an energy storage device of a switching module of the DC/AC converter, I current passing through it and U voltage across its terminals. The flow time of the current in the energy storage device is limited to the maximum.

With the full-wave control, the energy storage devices are now hardly invoked, and can have capacitance values twenty times smaller than those that they would have if the electronic power switches were controlled with conventional PWM control.

To improve the waveform of the signals at the output of the power conversion device with AC output which is the subject of the invention and to reduce the harmonics, it might be appropriate, instead of retaining the pure full-wave control throughout the whole time interval of operation of the power conversion device, to use a full-wave mixed control associated with a PWM control.

During the time interval of operation of the power conversion device, the PWM control will be used when the amplitude of the AC current in the load 70 is low, less than a threshold. The full-wave control will be used when the amplitude of the AC current in the load 70 is high, greater than or equal to the threshold. During PWM control, the modules of a half-arm are controlled successively and not simultaneously. This AC current flowing in the load is also called the output current of the modular multilevel power conversion device which is the subject of the invention.

This PWM control delivered by the control means 29, amounts to permitting the passage of a current in the second diode of the switching modules of a first half-arm and therefore in the energy storage device 4.3 of the modules of the first half-arm when the current in the load 70 is positive and its amplitude is less than the threshold. This PWM control amounts to permitting the passage of a current in the second electronic power switch of the switching modules of a second half-arm and therefore in the energy storage device of the modules of the second half-arm when the current in the load 70 is negative and its amplitude is less than the threshold.

By using this mixed control, the increase in the voltage across the terminals of the energy storage device 4.3 of the modules is limited and reasonable. The value to be given to the energy storage devices 4.3 is much less than that which it would have if conventional PWM control were employed permanently.

Indeed, the dimensioning of the energy storage devices with conventional PWM control is based on the frequency of the output signal for the temporal parameter (dt) and on the current (I) charging the energy storage device. The capacitance to be given to the energy storage devices corresponds to the case where the current is a maximum and the frequency a minimum. In the present invention, the current in the energy storage devices is never very high since the current in the load 70 has a limited amplitude of less than the threshold.

This full-wave mixed control associated with PWM control can be achieved by comparing a sinusoidal or truncated sinusoidal reference signal called the modulant with a sawtooth signal called the carrier.

It is possible to refer to FIGS. 5A1 and 5A2. In FIG. 5A1, the reference signal is a complete sinusoid and in FIG. 5A2 the reference signal is a sinusoid truncated at the level of the peaks. The frequency of the reference signal is the frequency of the signal desired at output and an amplitude greater than that of the sawtooth signal, if the sinusoid is complete, or equal to that of the sawtooth signal, if the sinusoid is truncated. The frequency of the sawtooth signal is the switching frequency of the electronic power switches. It is a higher frequency than that of the reference signal, it may be of the order of $10^3$ Hertz or even more.

In conventional PWM control, the amplitude of the reference signal is always lower than that of the carrier.

As long as the amplitude of the reference signal is lower than that of the carrier, the PWM control is used, and the voltage Va, Vb, Vc present at the level of the common terminals 3.1, 3.2, 3.3 follows the shape of the reference signal fairly faithfully. In the arm 1.1 for example, the current internal to the switching modules 4.11 to 4.16 passes through the energy storage devices 4.3 and either the second electronic power switches T211, T212, T213, T214, T215, T216, or the second diodes D211, D212, 0213, 0214, D215, 0216, depending on whether the current is positive or negative, during time intervals which correspond to the turning off of the first electronic power switches T111, T112, T113, T114, T115, T116. The controls of the electronic power switches of the various modules of a half-arm are successive. The controls of the electronic power switches of two homologous modules belonging to two half-arms of one and the same arm are synchronous.

As soon as the amplitude of the reference signal becomes equal to or greater than that of the carrier, the full-wave control is used and the voltage Va, Vb, Vc present at the level of the common terminals 3.1, 3.2, 3.3 strays from the shape of the reference signal, and possesses a shape comparable to the shapes shown in FIG. 4E in the vicinity of the peaks. As soon as the amplitude of the reference signal has attained that of the carrier, this signifies that the current in the load has attained the threshold. In the arm 1.1 for example, the current internal to the switching modules 4.11 to 4.16 does not pass through the energy storage devices 4.3, insofar as the first electronic power switches T111, 1112, 1113 or T114, T115, T116 of the switching modules 4.11, 4.12, 4.13 or 4.14, 4.15, 4.16 of one and the same half-arm remain turned on.

Figure 5B:
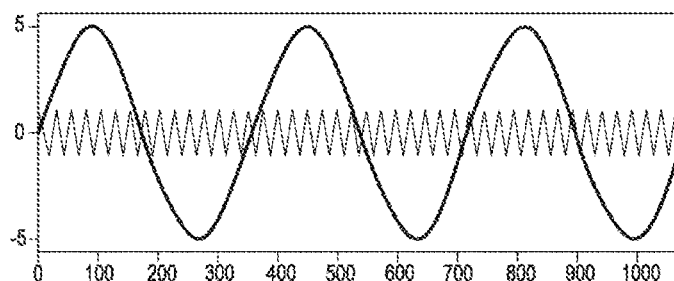
FIG. 5B illustrates the evolution, as a function of time, of the simple voltages Va, Vb, Vc.
Figure 5B:
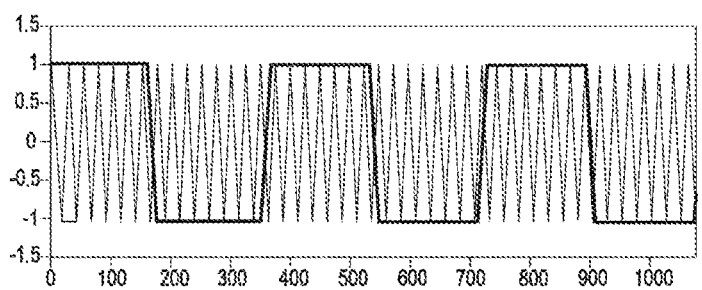
Figure 5B:
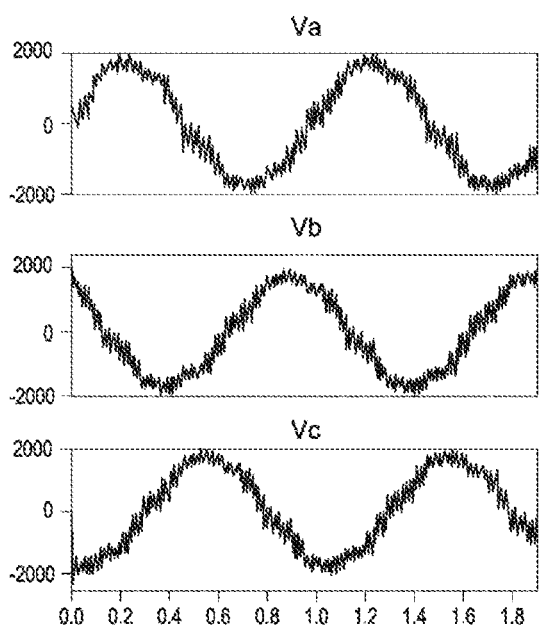

Represented in FIG. 5B, as a function of time, is the evolution of the simple voltage which is the voltage taken between each common terminal 3.1, 3.2, 3.3 and the common terminal 70.1 of the load 70, this simple voltage being called respectively Va, Vb, Vc. The scales differ between FIGS. 5A and 5B.

With a full-wave mixed control such as this, associated with a PWM control, by adjusting the amplitudes of the reference signal and of the carrier, it is possible to find a compromise making it possible to limit the voltage across the terminals of the energy storage devices while obtaining voltages at the level of the common terminals 3.1, 3.2, 3.3 whose frequency is controlled and which more closely approach the desired sinusoid.

As regards the modular multilevel DC/DC converter 20, its arm 20.1 can be formed of switching modules 26 identical to those of the modular multilevel DC/AC converter 21.

Its switching modules 26 are also controlled with full-wave control, like the modular multilevel DC/AC converter 21. Represented schematically in FIG. 3, with the reference 30 and for a single of the switching modules 26, are control means of its electronic power switches.

On the other hand the frequency of the full-wave control will be higher than that used in the modular multilevel DC/AC converter 21. This frequency may be of the order of about a hundred Hertz with a duty ratio $\alpha$ of between 0.1 and 0.9. The duty ratio $\alpha$ corresponds to the ratio between the on time of the first electronic power switches and the cutoff period. We have a relation of the type $Vs=\alpha Ve$ between the input voltage Ve and the output voltage Vs of the modular multilevel DC/DC converter 20. Controlling the value of the duty ratio $\alpha$ makes it possible to adjust the amplitude of the DC output voltage Vs.

Figure 6A:
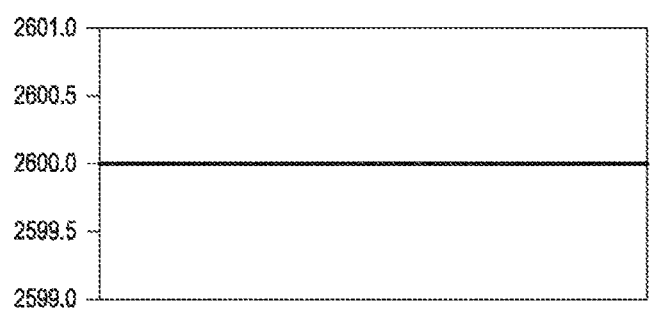
FIG. 6A illustrates the evolution, over time, of the DC voltage delivered by the DC electrical power supply illustrated in FIG. 3
Figure 6B:
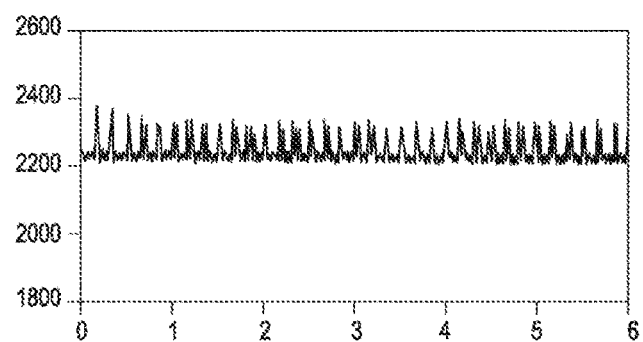
FIG. 6B illustrates, the evolution over time, of the DC voltage formed by the modular multilevel DC/DC converter illustrated in FIG. 3.

FIG. 6A illustrates the evolution, over time, of the DC voltage delivered by the DC electrical power supply 24 and FIG. 6B illustrates the evolution over time of the DC output voltage present across the terminals 27 and 28 which correspond to the output terminals of the modular multilevel DC/DC converter 20 for a given value of the duty ratio $\alpha$.

It is of course possible to control the modules 26 of the modular multilevel DC/DC converter 20 with a PWM control in which the reference signal is a constant and the carrier is a sawtooth signal.

We shall now focus attention on FIGS. 7A, 7B, 7C, 7D which show paths of the currents in the three-phase modular multilevel DC/AC converter 21 and in the three-phase load 70 in the variant of the full-wave control. Each of the phases of the load is linked to a common terminal 3.1, 3.2, 3.3.

Figure 7A:
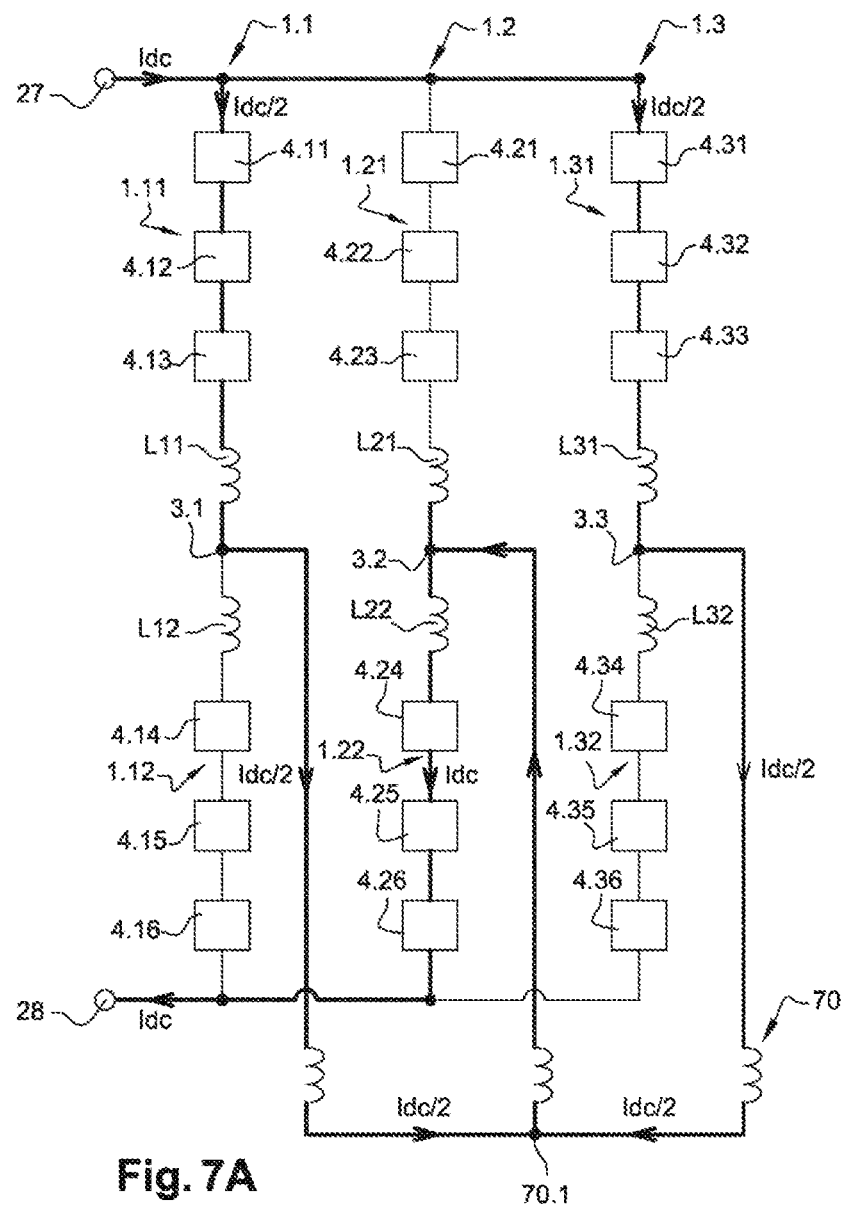
FIGS. 7A, 7B, 7C, 7D illustrate paths of currents flowing in the modular multilevel DC/AC converter of FIG. 3 and in a load supplied by this converter during full-wave control.
Figure 7B:
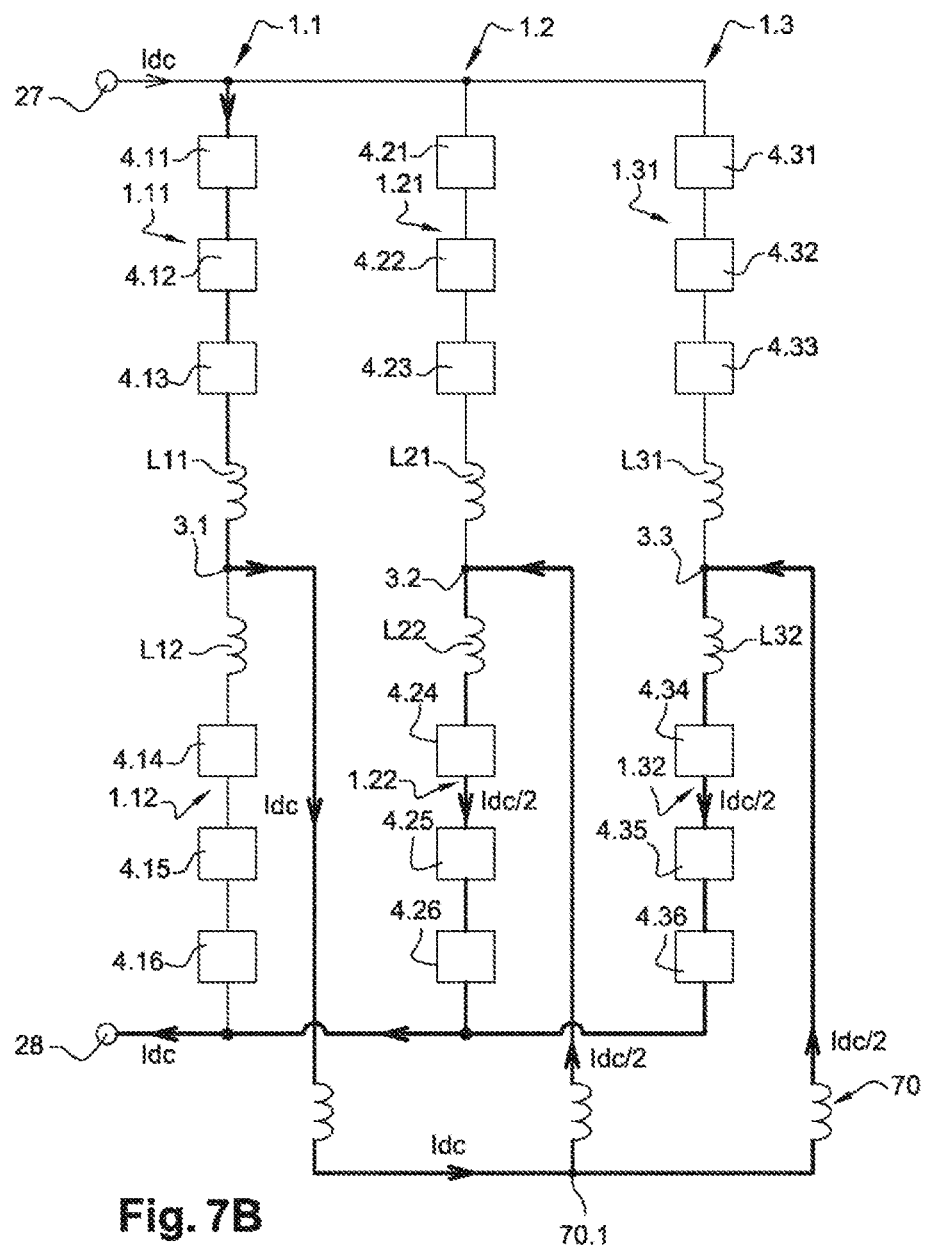
Figure 7C:
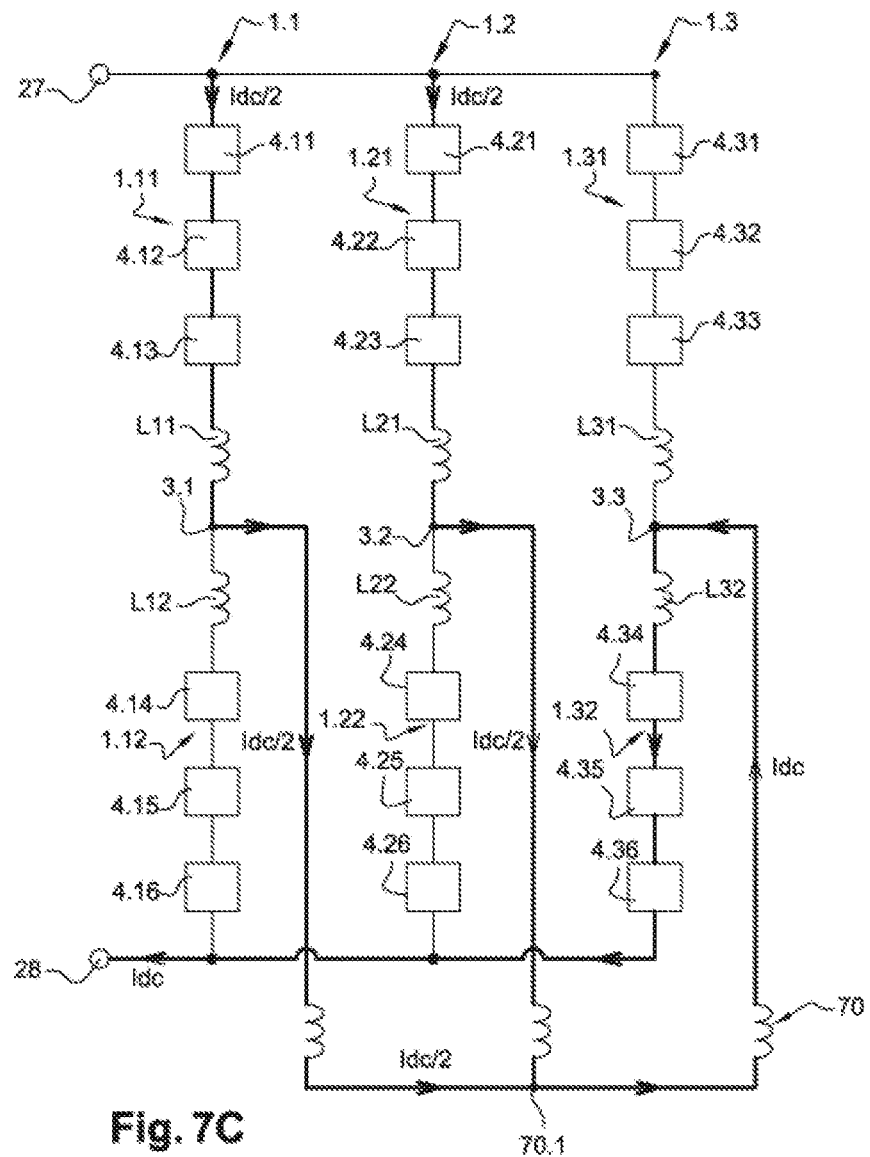
Figure 7D:
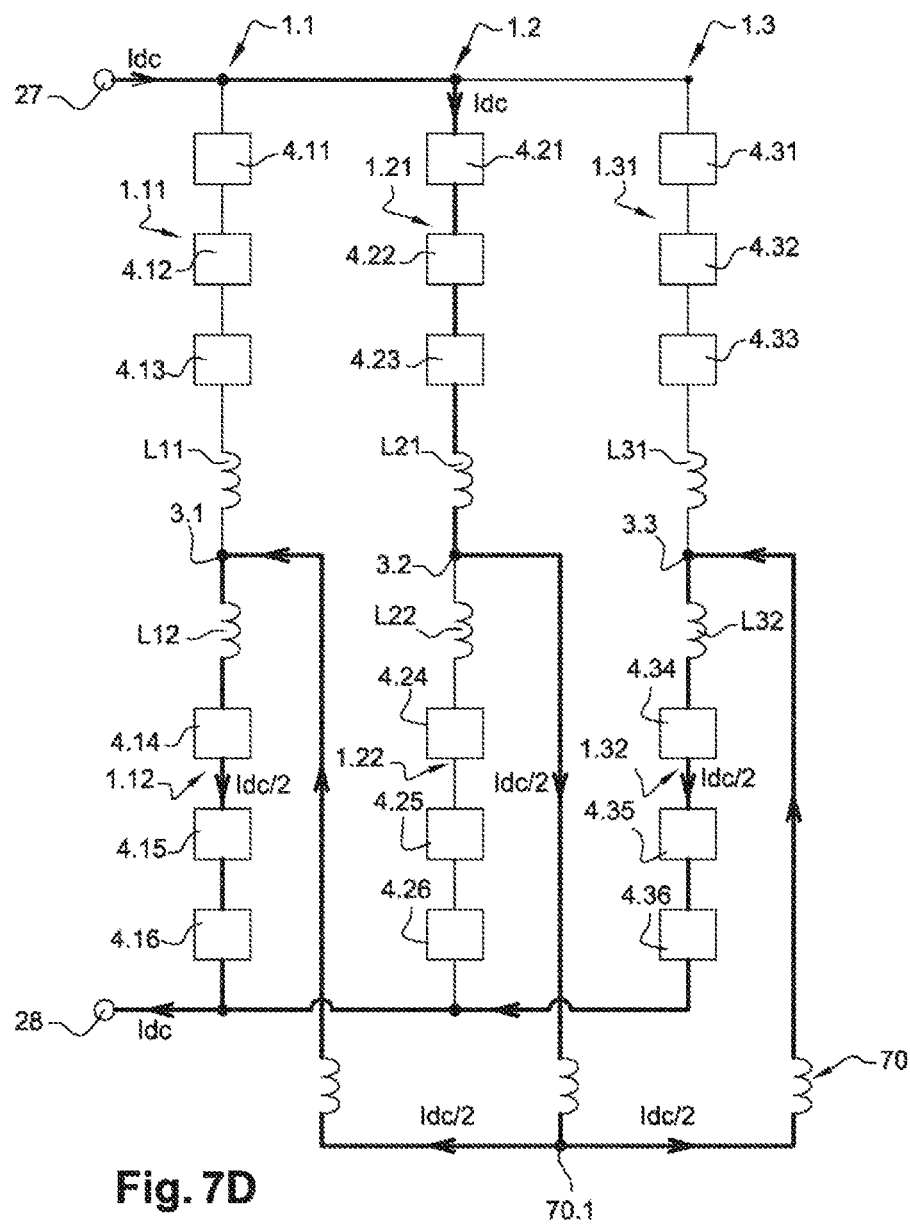

In FIG. 7A, the incoming charging current Idc is distributed substantially equitably in the first half-arm 1.11 of phase 1 and in the first half-arm 1.31 of phase 3, it travels through the load 70 and returns to the modular multilevel DC/AC converter 21 through the second half-arm 1.22 of phase 2. In FIG. 7B, the charging current Idc passes entirely into the first half-arm 1.11 of phase 1, it travels through the load 70 and returns to the modular multilevel DC/AC converter 21, through the second half-arm 1.22 of phase 2 the second half-arm 1.32 of phase 3 while being distributed substantially equitably in each of them. In FIG. 7C, the charging current Idc is distributed substantially equitably in the first half-arm 1.11 of phase 1 and in the first half-arm 1.21 of phase 2, it travels through the load 70 and returns to the modular multilevel DC/AC converter 21 through the second half-arm 1.32 of phase 3. In FIG. 7D, the charging current Idc passes entirely into the first half-arm 1.21 of phase 2, it travels through the load 70 and returns to the modular multilevel DC/AC converter 21 through a second half-arm 1.12 of phase 1 and the second half-arm 2.32 of phase 3 while being distributed substantially equitably in each of them. These diagrams correspond to a positive charging current Idc.

Because of the presence of the inductors L11, L12, L21, L22, L31, L32, when the modules of a half-arm, for example at the top, stop being controlled, and the modules of a half-arm, for example at the bottom, become controlled, the current takes a certain time to pass from the top half-arm to the bottom half-arm. But in view of the time scales, it may be considered that the output current is constant and that the transition which occurs is negligible. But it is during this transition that current will pass into the energy storage devices.

Figure 8:
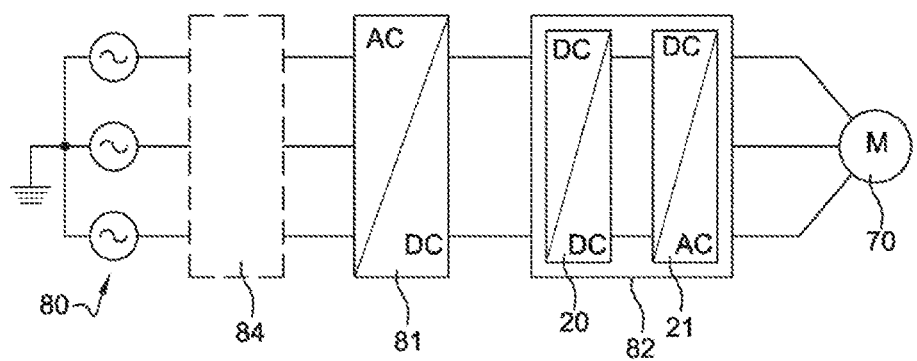
FIG. 8 illustrates a variable speed drive which comprises a modular multilevel power conversion device with DC input and AC output which is the subject of the invention.

Reference is now made to FIG. 8 which schematically represents a variable speed drive which is the subject of the invention. This variable drive includes a modular multilevel power conversion device with AC output and DC input 82 which is the subject of the invention.

The variable speed drive comprises starting from a three-phase AC electrical power supply 80, in cascade, an AC/DC converter 81, and then the modular multilevel DC/AC power conversion device 82 which is the subject of the invention. The load 70 is intended to be linked at the output of the modular multilevel DC/AC converter 21. As a function of the harmonic performance of the DC/AC power conversion device which is the subject of the invention, it may no longer be necessary to use smoothing filters which were necessary when employing a multilevel DC/AC converter of the prior art, such as NPC or ANPC converters, limited to five voltage levels. The full-wave mixed control associated with a PWM control makes it possible to reduce the harmonics with respect to full-wave control. More voltage levels are available at the output of the modular multilevel DC/AC power conversion device 82 than in the variant using full-wave control. The three-phase AC electrical power supply 80 is the AC network.

In the variable speed drives of the prior art which used a modular multilevel DC/AC converter like that of FIG. 1, there is also an AC/DC converter between the three-phase AC electrical power supply and the modular multilevel DC/AC converter. It was necessary to provide an LC filter for filtering the current and the voltage, placed between the modular multilevel DC/AC converter and the AC/DC converter. It was also possible to provide a current smoothing LC filter wired up between the three-phase AC electrical power supply and the AC/DC converter, and a voltage smoothing LC filter between the modular multilevel DC/AC converter and the load.

In the variable speed drive which uses a modular DC/AC power conversion device of the invention 82, a transformer is not compulsory. If it were used, it would be wired up between the three-phase AC electrical power supply 80 and the AC/DC converter 81. It is represented dashed, it being optional, with the reference 84. It serves to adapt the voltage level of the AC electrical power supply 80 which is, in medium-voltage variable speed drive applications, for example, between 2.3 kV and 15 kV.

The transformer is very often a bulky and expensive component. It can be dispensed with by virtue of the chain of modules in series, thereby enabling the voltage level of the three-phase AC electrical power supply to be supported directly.

Figure 9A:
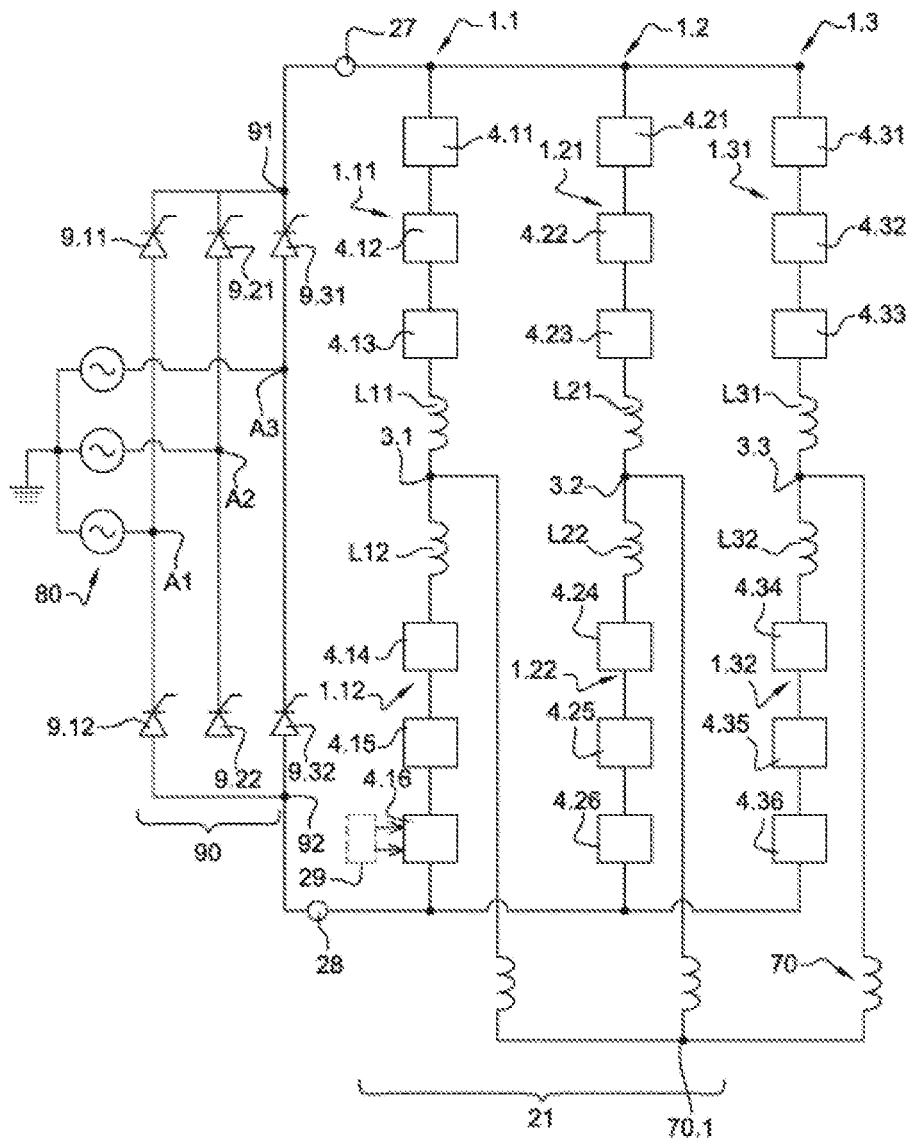
FIG. 9A illustrates another exemplary modular multilevel power conversion device with AC input and AC output which is the subject of the invention.

FIG. 9A now illustrates another example, nonlimiting, of modular multilevel AC/AC power conversion device which is the subject of the invention. In this example the modular multilevel AC/AC power conversion device is three-phase. It could of course be single-phase. This modular multilevel AC/AC power conversion device can serve as variable speed drive as is. It comprises a modular multilevel DC/AC converter 21 such as that described in FIG. 2, but no DC/DC modular multilevel converter. Instead of the DC/DC modular multilevel converter, there is an AC/DC converter 90 linked to the modular multilevel DC/AC converter 21. This AC/DC converter 90 is intended to be linked on one side to an AC electrical power supply 80. On the other, it is linked to the two DC terminals 27, 28 defined by the ends of the arms of the modular multilevel DC/AC converter 21.

The AC/DC converter 90 can be an AC/DC converter 90 of controlled-switching rectifier bridge type. It comprises three arms 90.1, 90.2, 90.3 mounted in parallel, their ends 91, 92 defining two DC terminals linked to the DC terminals 27, 28 of the modular multilevel DC/AC converter 21. Each arm 90.1, 90.2, 90.3 comprises two elementary semi-conductor breakers 9.11, 9.12, 9.21, 9.22, 9.31, 9.32 in series having a common node A1, A2, A3, each of these common nodes A1, A2, A3 defining an AC input terminal (or AC input) intended to be linked to the AC electrical power supply 80.

In FIG. 9A, the elementary breakers 9.11, 9.12, 9.21, 9.22, 9.31, 9.32 have been represented as thyristors, but this is merely a nonlimiting example. It is of course possible to replace them with other types of controllable semi-conductor breakers.

Figure 9B:
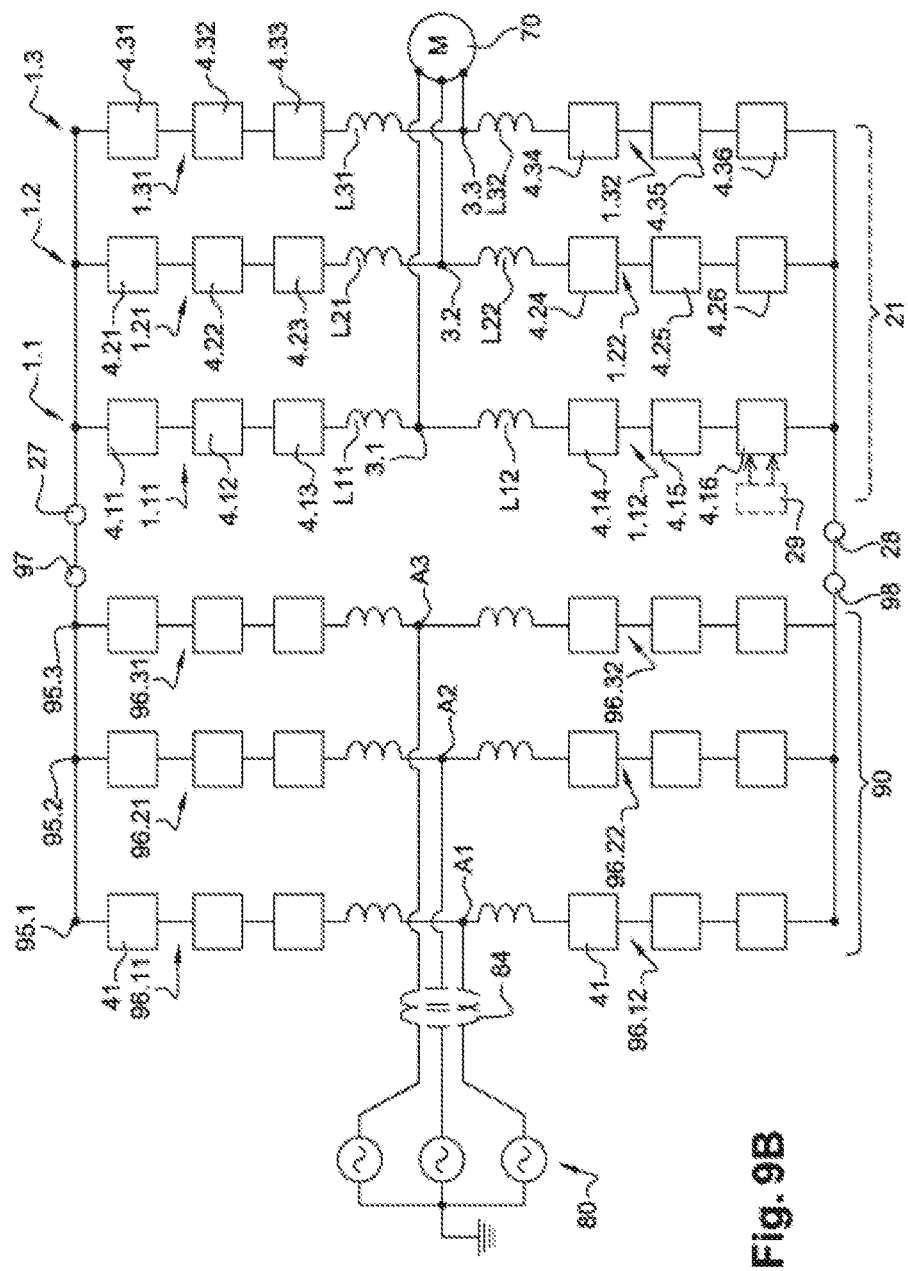
FIG. 9B illustrates a variable speed drive which comprises another exemplary modular multilevel power conversion device with AC input and AC output which is the subject of the invention.

In another embodiment illustrated in FIG. 9B, the AC/DC converter 90 has been replaced with a modular multilevel AC/DC converter having modules 41 similar to that of the modular multilevel DC/AC converter shown in FIG. 1, this modular multilevel AC/DC converter then possesses several arms 95.1, 95.2, 95.3 mounted in parallel whose ends define DC terminals 97, 98. These DC terminals are linked to the DC terminals 27, 28 of the modular multilevel DC/AC converter 21 and therefore merge with them. Each arm 95.1, 95.2, 95.3 comprises two chains 96.11, 96.12, 96.21, 96.22, 96.31, 96.32 of switching modules 41 mounted in series having a common terminal respectively 93.1, 93.2, 93.3. Connection to these common terminals is effected via an inductor. These common terminals 93.1, 93.2, 93.3 define AC terminals to be linked to the AC electrical power supply 80. Each switching module 41 is identical to that illustrated in FIGS. 2A-D. In FIG. 9B, provision has been made for a transformer 84 designed to be linked on one side to the AC electrical power supply 80 and linked on the other side to the AC input of the converter with AC input and DC output 90 of the modular multilevel power conversion device. The transformer 84 is optional.

In these embodiments the AC/DC converter is used to adjust the amplitude of the signal produced by the DC/AC modular multilevel converter.

Although several exemplary embodiments of the present invention have been represented and described in detail, it is understood that various changes and modifications may be made without departing from the scope of the invention.

The invention claimed is:

1. A modular multilevel power conversion device with an AC output and an AC or DC input, comprising:

a modular multilevel DC/AC converter comprising plural arms mounted in parallel whose ends define DC input terminals, each comprising two chains of switching modules in series, linked to a common terminal, the common terminal defining an AC output terminal of the modular multilevel power conversion device, each switching module comprising at least one pair of electronic power switches arranged in series, mounted on terminals of an energy storage device, the electronic power switches of one and a same chain, which are linked to a terminal of like polarity of the energy storage device, being termed homologues, the modular multilevel DC/AC converter being configured to adjust an output frequency of the modular multilevel conversion device; and a controller for the electronic power switches to place them in an on or off state; wherein the controller is configured to apply full-wave control to the electronic power switches during at least one part of a time interval of operation of the power conversion device, the switching modules of the one and the same chain then having homologous electronic power switches in one and a same state simultaneously, the controller is configured to apply, during at least one other remaining part of the time interval, a Pulse Width Modulation (PWM) control to the electronic power switches, the PWM control being applied when an output current of the modular multilevel power conversion device is less than a threshold and the full-wave control is applied when an output current of the modular multilevel power conversion device is greater than or equal to the threshold, the switching modules of the one and the same chain then having homologous electronic power switches in one and a same state successively; and further comprising a converter comprising a DC output and DC or AC input comprising two output terminals linked to the DC input terminals of the modular multilevel converter, the converter with DC output configured to adjust output amplitude of the power conversion device.

2. The modular multilevel power conversion device as claimed in claim 1, wherein each switching module comprises a first power switch linked to a terminal of positive polarity of the energy storage device and a second power switch linked to a terminal of negative polarity of the energy storage device, wherein, during full-wave control, a current flows only in the switching modules whose first power switch is in an on state.

3. The modular multilevel power conversion device as claimed in claim 1, wherein each electronic power switch is associated with a diode in antiparallel.

4. The modular multilevel power conversion device as claimed in claim 1, wherein each electronic power switch is one of an insulated-gate bipolar transistor, a field-effect transistor, a MOSFET transistor, a gate turn-off thyristor, an integrated gate-commutated thyristor.

5. The modular multilevel power conversion device as claimed in claim 1, wherein the energy storage device is one of a capacitor, a battery, a fuel cell.

6. The modular multilevel power conversion device as claimed in claim 1, wherein the connection of the chains of modules of one and a same arm to the common terminal is effected via inductors.

7. The modular multilevel power conversion device as claimed in claim 1, wherein a converter with DC output and DC input is a modular multilevel DC/DC converter possessing a single arm whose ends define two DC input terminals, comprising two half-arms in series having a common terminal, the common terminal defining one of the DC output terminals, one of the ends defining the other output terminal, each half-arm comprising a chain of switching modules with at least one pair of electronic power switches mounted in series, the pair being mounted across the terminals of an energy storage device, and a controller for the electronic power switches of each module.

8. The modular multilevel power conversion device as claimed in claim 7, wherein the controller for the electronic power switches of each module of the modular multilevel DC/DC converter applies full-wave control to the electronic power switches, the full-wave control having a larger frequency than the frequency of the full-wave control of the controller for the electronic power switches of each module of the modular multilevel DC/AC converter.

9. The modular multilevel power conversion device as claimed in claim 1, wherein a converter with DC output and AC input is a controlled-switching rectifier bridge.

10. The modular multilevel power conversion device as claimed in claim 1, wherein a converter with DC output and AC input is a modular multilevel AC/DC converter.

11. A variable speed drive comprising a modular multilevel power conversion device as claimed in claim 1.

12. The variable speed drive as claimed in claim 11, wherein the modular multilevel power conversion device comprises a converter with DC output and AC input, the AC input being configured to be linked to an AC electrical power supply.

13. The variable speed drive as claimed in claim 11, wherein the modular multilevel power conversion device comprises a converter with DC input and DC output, the variable speed drive further comprises a converter comprising an AC input and DC output, configured to be linked on AC input side to an AC electrical power supply and linked on DC output side to the converter with DC input and DC output.

14. The variable speed drive as claimed in claim 13, further comprising a transformer configured to be linked on one side to the AC electrical power supply and linked on an other side to the AC input of the converter with AC input and DC output of the modular multilevel power conversion device.

* * * * *